July 3, 1962     D. F. BACHMAN     3,041,782

PORTABLE PLANTER

Filed Dec. 9, 1958

Don F. Bachman
INVENTOR.

BY Robert J. Patin
ATTY ns patent
3,041,782
Patented July 3, 1962

3,041,782
PORTABLE PLANTER
Don F. Bachman, 4207 E. 7th Place, Tulsa, Okla.
Filed Dec. 9, 1958, Ser. No. 779,122
1 Claim. (Cl. 47—39)

The present invention relates to a portable planter, that is, to a portable stand for supporting growing plants.

It is an object of the present invention to provide a planter which may be readily moved from place to place.

Another object of the present invention is the provision of a portable planter which has the appearance of a non-portable structure.

Finally, it is an object of the present invention to provide a portable planter which will be simple and inexpensive to construct, easy to utilize and clean, and rugged and durable in use.

Other objects and advantages of the present invention will become apparent from a consideration of the following description, taken in connection with the accompanying drawing, in which.

Figure 1:
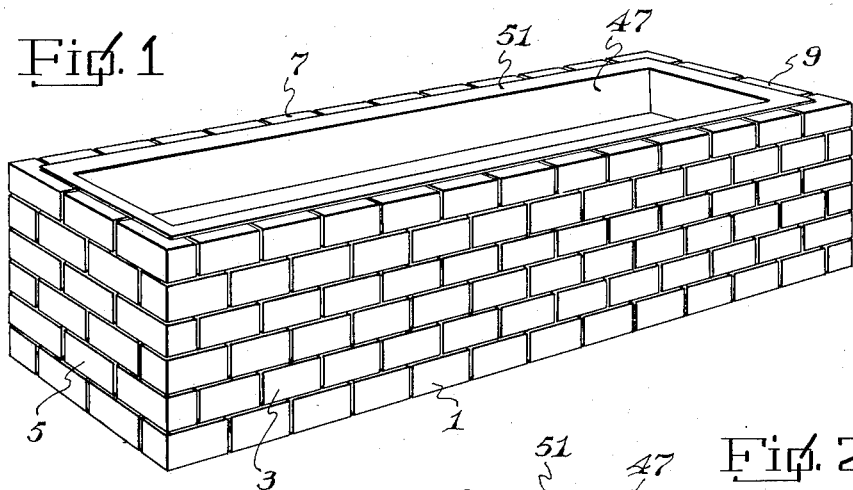
FIGURE 1 is a perspective view of a portable container according to the present invention.

Referring now to the drawing in greater detail, there is shown a portable planter comprising a rectangular support 1 which is open at its top and bottom and has vertical sidewalls 3, 5, 7 and 9. The sidewalls are comprised of a plurality of bricks 11 held in unitary assembly by mortar 13 much in the manner of a conventional brick wall.

The brickwork rests on an open rectangular horizontal frame indicated generally at 15 which has four generally uniplanar legs 17, 19, 21 and 23. Legs 17 and 21 are relatively long and parallel to each other and legs 19 and 23 are relatively short and are parallel to each other and perpendicular to the legs 21 and 17. The four legs are interconnected at their ends to form a rigid open frame. Each leg has an inner vertical flange 25 and a horizontal flange 27 extending outwardly from the bottom of vertical flange 25. Vertical flanges 25 are interconnected at their ends and horizontal flanges 27 are interconnected at their ends thereby to lend rigidity to frame 15.

Secured at their opposite ends to legs 17 and 21 in spaced relationship and in parallelism to each other is a pair of crossbars 29 and 31. Crossbar 29 is disposed adjacent leg 19 and crossbar 31 is disposed adjacent leg 23. Adjacent the ends of each crossbar are upwardly extending cylindrical socket sleeves 33, each of which has an annular internal groove 35 adjacent its upper end for the reception of a resilient lock ring 37 which fits inwardly in an annular external groove 39 adjacent the upper end of a spindle 41 of a conventional roller bearing swivel caster wheel 43. In this way, the planter is supported for rolling movement on a subjacent support at points adjacent the opposite ends of crossbars 29 and 31. Although four wheel assemblies are shown, it will of course be understood that three may be used, in which case one of crossbars 29 or 31 would have wheels adjacent opposite ends thereof as shown, while the other crossbar might have a centrally disposed wheel; but this alternative is less preferable than that in which there are four wheels disposed substantially as shown, as the rigidity of the framework is greatest with the arrangement shown.

Figure 2:
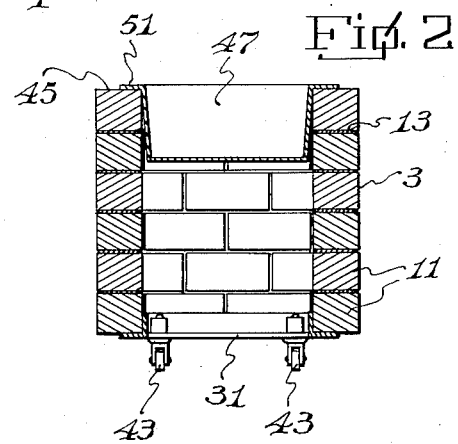
FIGURE 2 is a transverse cross-sectional view of a portable planter according to the present invention.
Figure 3:
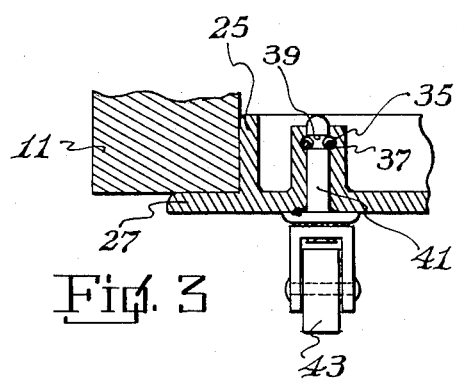
FIGURE 3 is an enlarged fragment of FIGURE 2.
Figure 4:
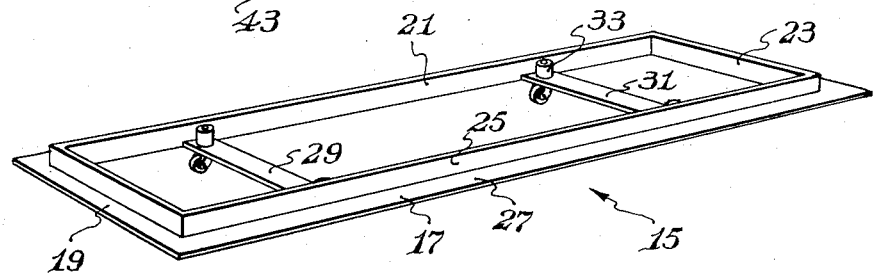
FIGURE 4 is a perspective view showing the supporting structure on which the brickwork of the planter rests.

A very important feature of the present invention is the relationship of the lowermost course of bricks 11 to the rectangular frame 15. As seen in FIGURES 2 and 3, the bricks 11 are of a width which is almost twice the width of horizontal flange 27 measured from the outer face of vertical flange 25. In other words, this width of horizontal flange 27 is only slightly more than half the width of the bricks 11, so that the bricks will be supported in an equilibrium position on horizontal flange 27 when the lowermost course is being laid but at the same time will project a maximum distance outwardly beyond the outer edge of horizontal flanges 27. In this way, the bricks may be conveniently laid on flange 27 but will conceal flange 27 and wheels 43 when viewed from the upper positions as seen in FIGURE 1. Thus, the attractive appearance of fixed brickwork is imparted to the planter and the anomalous appearance of a portable brick structure is avoided while actually preserving the portability thereof. It will also be understood that when the lowermost course of bricks 11 is completed about all four vertical sidewalls 3, 5, 7 and 9, the mortar between these bricks will bind them together so that there is no tendency for the bricks to topple off the flanges 27.

It is also a preferred feature of the present invention that the bricks 11 of the lowermost course extend above the upper edges of vertical flanges 25. In this way, the mortar in the lowermost horizontal joint, that between the first and second courses of bricks, will be exposed and can be troweled from the inside and will not contact the vertical flanges 25. Thus, there is avoided the situation in which the mortar in this lowermost horizontal joint would be forced inwardly from between the first and second courses of bricks under the influence of the weight of the second and higher courses of bricks in a manner such as might space the bricks of the first or second courses variable distances from the vertical flanges 25 and thus cause vertical misalignment of the bricks of the various courses.

Accordingly, there is provided a plurality of vertically aligned courses of bricks which terminate upwardly in an uppermost course having a uniplanar horizontal upper edge 45. A plant receptacle 47 is supported on upper edge 45 and comprises a sheet metal container having an open top and a closed bottom 49 from which four sidewalls extend upwardly. The sidewalls of the receptacle terminate upwardly in a continuous outwardly extending flange 51 which rests on all four sides on upper edge 45 of the brickwork. Thus, receptacle 47 is supported within the open upper end of rectangular support 1 substantially flush with that support. Of course, it is intended that receptacle 47 contain dirt in which plants may be grown. Receptacle 47 is water-tight and the plants can be watered when the receptacle is in place in its brickwork support. Since the receptacle simply rests by gravity on the brickwork, it can be removed for cleaning or replanting or replacement or the like.

It is also important to observe the relationship between horizontal flanges 27 of rectangular frame 15 and the continuous horizontal uniplanar flange 51 of receptacle 47. It will be noted that this latter flange extends outwardly to about the same extent as horizontal flanges 27; and hence, it will be obvious that the stresses imposed on the brickwork by the combined weights of receptacle 47 and its contents and the various courses of bricks 11 are borne by bricks 11 in compression along vertical lines, so that the tendency of these weights to cause the brickwork to buckle is at an absolute minimum.

As indicated above, the device of the present invention is constructed simply by laying a plurality of courses of brickwork on legs 17, 19, 21 and 23 in the usual offset interlocking relationship. This brickwork is thus permanently mounted on frame 15, although it is not necessarily bonded to flanges 25 and 27. The placement of receptacle 47 within the open upper end of the rectangular support thus provided completes the assembly, and caster wheels 43 may be snapped into their sockets at any desired point during assembly. The resulting device can then be pushed from place to place within a building so as to secure the desired decorative effect, and the weight of the brickwork will lend an additional measure of stability to the device in its desired rest position so that it will not tend to roll freely out of place.

From a consideration of the foregoing description, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

A portable planter comprising an open rectangular horizontal frame comprised by two relatively long legs and two relatively short legs, a vertical side wall supported on each leg of the frame, a pair of horizontally spaced crossbars extending between the relatively long legs and disposed one adjacent but spaced from each relatively short leg, downwardly depending wheels carried by both crossbars, at least two of the wheels being disposed adjacent opposite ends of one of the crossbars, the wheels being carried by vertical spindles, socket sleeves extending upward from the crossbars, the spindles being carried by the crossbars in the socket sleeves, and an open-topped plant receptacle supported by the vertical side walls.

References Cited in the file of this patent

UNITED STATES PATENTS

| | | |
|---|---|---|
| D. 104,221 | Miller | Apr. 20, 1937 |
| 542,942 | Pelton | July 16, 1895 |
| 837,524 | Wharton | Dec. 4, 1906 |
| 1,764,543 | Barton | June 17, 1930 |
| 1,808,402 | Cooper | June 2, 1931 |
| 1,820,843 | Spitz | Aug. 25, 1931 |
| 2,707,351 | Walker | May 3, 1955 |